(12) United States Patent
Perlman

(10) Patent No.: US 7,874,010 B1
(45) Date of Patent: Jan. 18, 2011

(54) METHOD AND APPARATUS FOR USING SECRET KEYS TO MAKE DATA PERMANENTLY UNREADABLE

(75) Inventor: Radia J. Perlman, Sammamish, WA (US)

(73) Assignee: Oracle America, Inc., Redwood Shores, CA (US)

( * ) Notice: Subject to any disclaimer, the term of this patent is extended or adjusted under 35 U.S.C. 154(b) by 1674 days.

(21) Appl. No.: 10/959,928

(22) Filed: Oct. 5, 2004

Related U.S. Application Data

(60) Provisional application No. 60/514,400, filed on Oct. 24, 2003.

(51) Int. Cl.
*G06F 7/04* (2006.01)
*G06F 17/30* (2006.01)
*H04N 7/16* (2006.01)

(52) U.S. Cl. .......................... 726/28; 380/30; 380/264; 380/277; 380/278; 380/279; 380/281; 380/282; 380/286; 726/29; 726/31; 709/207; 709/204; 709/206; 713/171; 713/172; 713/168; 713/176

(58) Field of Classification Search ................. 713/182, 713/168; 380/30, 277; 709/224
See application file for complete search history.

(56) References Cited

U.S. PATENT DOCUMENTS

| | | | |
|---|---|---|---|
| 6,363,480 B1 | 3/2002 | Perlman ...................... 713/164 |
| 6,539,479 B1* | 3/2003 | Wu ............................. 709/224 |
| 6,625,734 B1* | 9/2003 | Marvit et al. .................. 726/28 |
| 6,948,065 B2* | 9/2005 | Grawrock .................... 713/168 |
| 7,240,214 B2* | 7/2007 | Gazzetta et al. ............. 713/182 |

(Continued)

OTHER PUBLICATIONS

Omniva Policy Systems "Electronic Document Retention: Reducing Potential Liability for Email" by Michael R. Overly.

(Continued)

*Primary Examiner*—William R Korzuch
*Assistant Examiner*—Bryan Wright
(74) *Attorney, Agent, or Firm*—Park, Vaughan, Fleming & Dowler LLP

(57) ABSTRACT

One embodiment of the present invention provides a system that manages secret keys for messages. During operation, the system receives a desired expiration time T from an encrypter, and possibly a nonce N, at a server that manages keys. If N is not sent by the encrypter, it is generated by a key managing server. Next, the system chooses a secret $S_T$, with an expiration time close to T, and an identifier $ID_S$ from a database for which secret $S_T$ can be retrieved using the identifier $ID_S$. If such an $S_T$ is not already in the database, the server generates a new $S_T$ and $ID_S$. The system then calculates a hash H=h(N, $S_T$), and sends H and $ID_S$ from the server to the encrypter. The encrypter then encrypts M with H to form {M}H, and communicates ({M}H, N, $ID_S$) to a message reader. The message reader then sends N and $ID_S$ to the server. The server then uses $ID_S$ to lookup $S_T$, recalculates H=h(N,$S_T$), and sends H to the message reader, thereby enabling the message reader to decrypt {M}H to obtain M. Note that by using the secret $S_T$ associated with the expiration time T and the nonce N, the server is able to reconstruct the secret key H for the message M without having to maintain per-message state information.

24 Claims, 2 Drawing Sheets

U.S. PATENT DOCUMENTS

| | | | |
|---|---|---|---|
| 2001/0055388 A1* | 12/2001 | Kaliski, Jr. | 380/30 |
| 2002/0136410 A1* | 9/2002 | Hanna | 380/277 |
| 2002/0191797 A1 | 12/2002 | Perlman | 380/281 |
| 2003/0200433 A1* | 10/2003 | Stirbu | 713/169 |
| 2003/0233541 A1* | 12/2003 | Fowler et al. | 713/155 |
| 2004/0083297 A1* | 4/2004 | Gazzetta et al. | 709/229 |

OTHER PUBLICATIONS

Omniva Policy Manager "Technical White Paper" Jan. 2004.

* cited by examiner

METHOD AND APPARATUS FOR USING SECRET KEYS TO MAKE DATA PERMANENTLY UNREADABLE

RELATED APPLICATIONS

This application hereby claims priority under 35 U.S.C. §119 to U.S. Provisional Patent Application No. 60/514,400, filed on 24 Oct., 2003, entitled "Ephemerizer: Making Data Disappear," by inventor Radia J. Perlman.

BACKGROUND

1. Field of the Invention

The present invention relates to techniques for encrypting and decrypting data. More specifically, the present invention relates to a method and an apparatus that manages secret keys in a manner that facilitates making data permanently unreadable.

2. Related Art

Making data robustly available is an important and difficult problem, but sometimes it is equally important for the data to become reliably unrecoverable. One example is email. One might want a certain class of emails to be readable for only some finite amount of time, say two weeks. Even if the data is explicitly deleted, copies may remain on backup media, or may have been captured and stored in transit (e.g., at a router or mail transfer agent) or even be forensically recovered from disk.

There are some email systems that have a "self-destruct" feature. This is implemented purely in the mail reading client, and involves no cryptography. It just means that the copy of the email at the client is automatically deleted after reading (or perhaps merely marked as deleted). There are also commercial systems that allow setting policies, which state that email should be deleted automatically after some time. Again, this involves no cryptography, and copies on backup media would of course not go away.

Another approach is to only store the data in encrypted form, and then destroying it is a somewhat easier problem because we just need to delete the key. However, long-term user keys can, over time, be made available through compromise or coercion. It is possible for keys to be kept in tamper-resistant smart cards, in which case it would not be feasible to covertly discover the key. To delete the data, the user need only destroy the smart card. But it is expensive to require every user to have a smart card and every computer to have a smart card reader.

A more sophisticated system for managing secret keys was designed by a company called Disappearing, Inc. This system uses a special server whose job it is to create and destroy keys. We will refer to this server as an "ephemerizer". Conceptually, the Disappearing, Inc. system worked as follows:
1. If Alice wishes to create an encrypted message for Bob, she contacts the ephemerizer, requesting a key and an expiration time.
2. The ephemerizer chooses a random secret key K, assigns a key identifier, $ID_K$, tells Alice: $(K, ID_K)$, and remembers: (expiration time, K, $ID_K$).
3. Alice encrypts the message M with K to obtain $\{M\}K$ and sends to Bob: $(\{M\} K, ID_K)$
4. When Bob wishes to decrypt the message, he sends the ephemerizer: $ID_K$.
5. The ephemerizer replies with K, and then Bob can decrypt the message.
6. When the expiration time is reached, the ephemerizer forgets K.

To be secure, Alice and Bob communicate with the ephemerizer via some protected channel such as Secure Sockets Layer (SSL), in which they authenticate that they are indeed talking to the ephemerizer, and such that the messages between the ephemerizer and a client are encrypted.

A nice property of the Disappearing, Inc. system is that the ephemerizer could be built so it does not see messages. However, the ephemerizer must create and store a key for every ephemerally created message. This can involve storing a large amount of data if the system is used for encryption of many messages.

Hence, what is needed is a method and an apparatus that manages secret keys in a manner that facilitates making data disappear without the above-described problems.

SUMMARY

One embodiment of the present invention provides a system that manages secret keys for messages. During operation, the system receives a desired expiration time T from an encrypter, and possibly a nonce N, at a server that manages keys. If N is not sent by the encrypter, it is generated by a key managing server. Next, the system chooses a secret $S_T$, with an expiration time close to T, and an identifier $ID_S$ from a database for which secret $S_T$ can be retrieved using the identifier $ID_S$. If such an $S_T$ is not already in the database, the server generates a new $S_T$ and $ID_S$. The system then calculates a hash $H=h(N,S_T)$, and sends H and $ID_S$ from the server to the encrypter. The encrypter then encrypts M with H to form $\{M\}H$, and communicates $(\{M\} H, N, ID_S)$ to a message reader. The message reader then sends N and $ID_S$ to the server. The server then uses $ID_S$ to lookup $S_T$, recalculates $H=h(N, S_T)$, and sends H to the message reader, thereby enabling the message reader to decrypt $\{M\}H$ to obtain M. Note that by using the secret $S_T$ associated with the expiration time T and the nonce N, the server is able to reconstruct the secret key H for the message M without having to maintain per-message state information.

In a variation on this embodiment, the server forgets both N and H.

In a variation on this embodiment, while ensuring that the secret $S_T$ is stored on the server, the system first determines if the secret $S_T$ is already stored on the server for the expiration time T. If not, the system generates secret $S_T$ for the expiration time T, and stores $S_T$ on the server.

In a variation on this embodiment, when the expiration time T is reached, the server forgets the secret $S_T$.

In a variation on this embodiment, if N is not received from the encrypter, but is instead generated by the server, sending H from the server to the encrypter additionally involves sending N from the server to the encrypter.

In a variation on this embodiment, the secret $S_T$ for expiration time T, is computed by applying a hash function h to a secret $S_{T-1}$ for a preceding expiration time T−1, so that $S_T$=h$(S_{T-1})$. This allows space to be saved by storing fewer $S_T$'S, possibly only a single one, and by repeatedly applying the hash function h to $S_T$ to compute secrets for subsequent expiration times. (Note that this hash function h need not be the same hash function h that was used to hash N and $S_T$ to get the per-message encryption key H.)

In a variation on this embodiment, the server stores a different secret for each combination of expiration time and security property. In this way, the server can store multiple secrets with different security properties for each expiration time.

In a variation on this embodiment, the nonce N is a per-message nonce which is generated specifically for the message M.

In a variation on this embodiment, storing $S_T$ involves generating and storing $S_T$ on a tamper-resistant smart card, which receives $ID_S$ and N, calculates H, and does not reveal $S_T$.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

System

Figure 1:
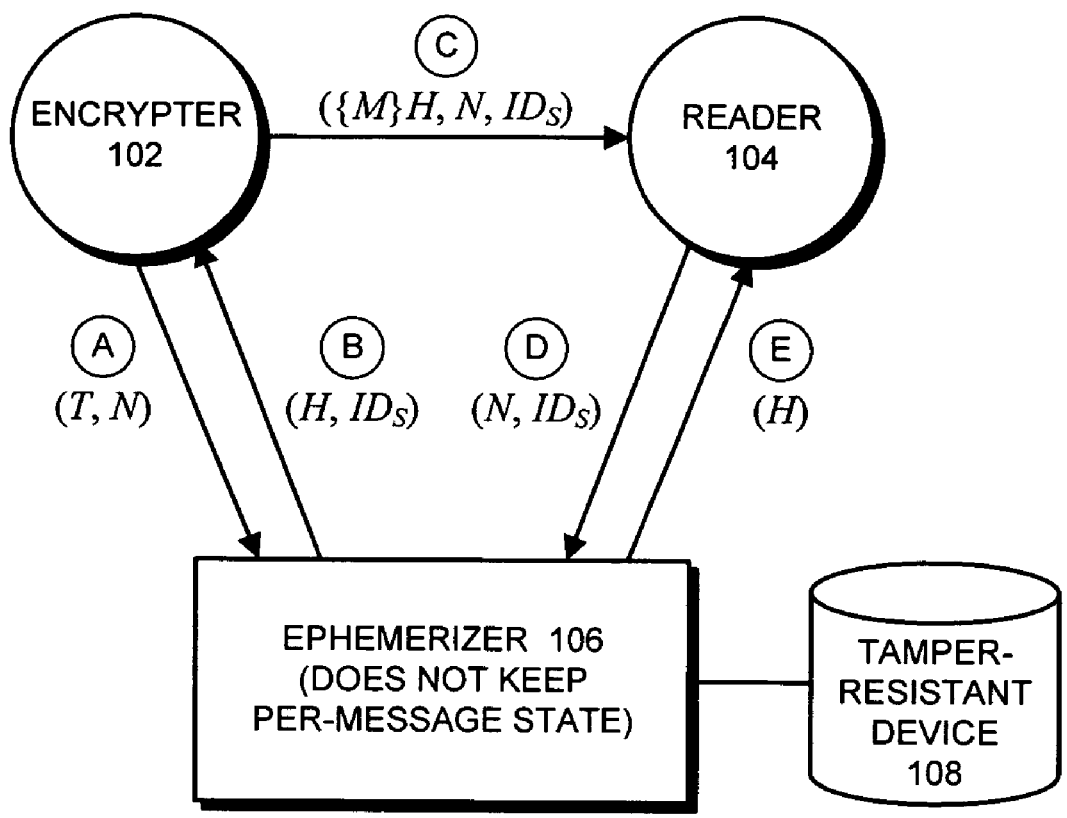
FIG. 1 illustrates a message encrypter, a message reader and an ephemerizer in accordance with an embodiment of the present invention.

FIG. 1 illustrates a message encrypter 102, a message reader 104 and an ephemerizer 106 in accordance with an embodiment of the present invention. Encrypter 102, reader 104 and ephemerizer 106 can generally include any type of computer system or computing device, including, but not limited to, a computer system based on a microprocessor, a mainframe computer, a digital signal processor, a portable computing device, a personal organizer, a device controller, and a computational engine within an appliance. Encrypter 102, reader 104 and ephemerizer 106 may also be computing processes or software modules within the same computer system or within different computer systems.

During operation of the system illustrated in FIG. 1, encrypter 102 encrypts a message M and transmits the encrypted message to reader 104. Upon receiving the encrypted message, reader 104 decrypts the encrypted message to restore the message M. These encryption and decryption operations are performed with help from ephemerizer 106.

Ephemerizer 106 is configured to service requests from encrypter 102 and reader 104 to perform operations involving secret keys. These operations can involve creating, storing, and destroying secret keys, as well as using secret keys to encrypt and decrypt information. In one embodiment of the present invention, ephemerizer 106 is configured to generate and store secret keys in a tamper-resistant device 108 (such as a smart card).

The operations performed by encrypter 102, reader 104 and ephemerizer 106 are described in more detail below with reference to FIG. 2.

Encryption and Decryption Processes

Figure 2:
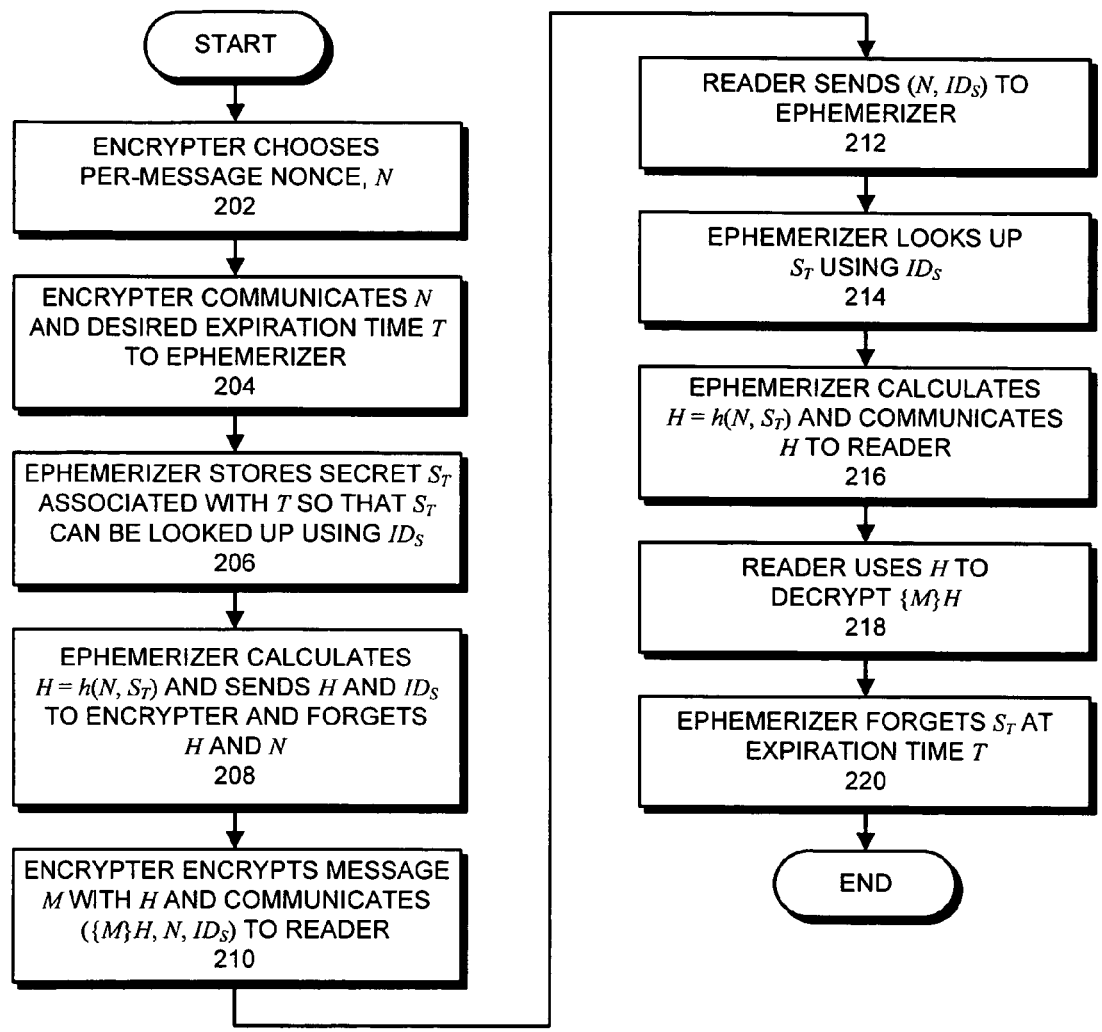
FIG. 2 presents a flow chart illustrating the process of encrypting and decrypting a message using secret keys in accordance with an embodiment of the present invention.

FIG. 2 presents a flow chart illustrating the process of encrypting and decrypting a message M using secret keys in accordance with an embodiment of the present invention. First, encrypter 102 (or optionally ephemerizer 106) chooses a per-message nonce, N (step 202). (Note that a "nonce" is a non-repeating value.) Next, encrypter 102 communicates a desired expiration time T, and possibly a nonce N, to ephemerizer 106 (step A in FIG. 1 and step 204 in FIG. 2). If encrypter 102 does not send N to ephemerizer 106, ephemerizer 106 chooses an N, and sends it to encrypter 102.

Ephemerizer 106 stores a secret $S_T$ associated with expiration time T so that $S_T$ can be looked up using an identifier $ID_S$ (step 206). The system first determines if a secret $S_T$ is already stored on the server for the expiration time T. If not, the system generates secret $S_T$, and stores $S_T$ on the server for the expiration time T.

Next, ephemerizer 106 calculates a hash $H=h(N,S_T)$, and sends H and $ID_S$ to encrypter 102 (step B in FIG. 1 and step 208 in FIG. 2). Ephemerizer 106 then forgets the per-message state information, H and N.

Upon receiving H and $ID_S$, encrypter 102 encrypts a message with H and communicates ({M} H, N, $ID_S$) to reader 104 (step C in FIG. 1 and step 210 in FIG. 2).

To later decrypt {M}(H) (of the quantity ({M}H, N, $ID_S$) received from encrypter 102), reader 104 first needs to obtain H. To obtain H, reader 104 sends (N, $ID_S$) to ephemerizer 106 (step D in FIG. 1 and step 212 in FIG. 2).

Ephemerizer 106 then looks up $S_T$ using $ID_S$ (step 214). Ephemerizer 106 then calculates $H=h(N,S_T)$, and communicates H to reader 104 (step E in FIG. 1 and step 216 in FIG. 2).

Reader 104 then uses H to decrypt {M}H to restore M (step 218).

Finally, when the expiration time T is reached, the system forgets the secret key $S_T$ (step 220). This makes any messages which have been encrypted with $S_r$ unreadable.

Unlike the Disappearing, Inc. system, the present invention avoids the necessity for the ephemerizer to keep per-message state information. It does mean that someone who compromises a single one of the ephemerizer's secret S's compromises all messages encrypted with that secret. However, note that in the Disappearing, Inc. system anyone who compromises the ephemerizer's data would capture all the per-message keys anyway. The present invention is probably more secure in practice because it would be easier to adapt the present invention to store the secret keys on a tamper-resistant smart card, since the database is so much smaller.

One could save even more space by rolling over keys with a one-way hash function. Instead of generating a new secret for each expiration time, the secret for expiration time T might be $S_T$, the secret for expiration time one time unit later would be $h(S_T)$, and the secret for expiration time two time units later would be $h(h(S_T))$, and so on. The current secret, $S_T$, is the one about to expire. Every time unit, the current secret $S_r$ is forgotten and replaced by $h(S_r)$. This saves storage if the ephemerizer is willing to compute $h''(S_r)$ in order to encrypt or decrypt a message with a key n units from the current secret. Otherwise, the ephemerizer could pre-compute the next n secrets and store them, in which case it does not save any storage.

Either of the above enhancements might be able to be made on-the-wire compatible with Disappearing, Inc.'s system, and therefore could be implemented as an optimization at the server without modifying the clients. This might be done by having ephemerizer 106, rather than Alice (who is equivalent to encrypter 102), choose the nonce, and have what appears to Alice to be the identifier of the per-message secret actually be the tuple (N, $ID_S$).

Furthermore, as mentioned above, in one embodiment of the present invention, the server stores a different secret for each combination of expiration time and security property. In this way, the server can store multiple secrets with different security properties for each expiration time.

Note that a similar ephemerizer, which maintains secret keys with expiration times, is disclosed in U.S. Pat. No. 6,363,480, entitled "Ephemeral Decryptability," by inventor Radia J. Perlman. However, the encryption technique disclosed in this patent is based on public-key/private key pairs, which require the ephemerizer to perform many more computational operations than for the symmetric keys used by the present invention. This larger number of computational operations can place a significantly larger computational burden on the ephemerizer.

Unlike the ephemerizer disclosed in U.S. Pat. No. 6,363,480, the ephemerizer of the present application generates a per-message key H using a per-message nonce N. The ephemerizer then forgets the per-message nonce N (which is passed along with the encrypted message) and per-message key H. The ephemerizer is subsequently able to regenerate this per-message key H from the nonce N and a secret $S_T$, which is associated with an expiration time T.

In this way, the present invention is able regenerate the per-message key without having to maintain per-message state information. This is a considerable advantage because the number of messages can be quite large, and storing per-message state information can require a large amount of storage space.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing secret keys for messages, comprising:
   receiving a desired expiration time T and a nonce N at a server that manages keys, wherein T (and possibly N) is received from an encrypter of a message M, wherein if N is not received from the encrypter, N is chosen by the server;
   ensuring that a secret $S_T$ associated with the expiration time T is stored on the server so that $S_T$ can be looked up using an identifier $ID_S$;
   calculating a hash $H=h(N,S_T)$, thereby generating a key H for encrypting and decrypting message M;
   sending H and $ID_S$ from the server to the encrypter, thereby allowing the encrypter to encrypt M with H to form {M}H, and to communicate ({M}H,N,$ID_S$) to a message reader;
   deleting H and N at the server before expiration time T and after sending H and $ID_S$ to the encrypter;
   subsequently receiving N and $ID_S$ at the server from the message reader;
   using $ID_S$ to lookup $S_T$;
   recalculating $H=h(N,S_T)$; and
   sending H to the message reader, thereby enabling the message reader to decrypt {M}H to obtain M;
   wherein by using the secret $S_T$ associated with the expiration time T and the nonce N, the server is able to reconstruct the secret key H for the message M.

2. The method of claim 1, wherein ensuring that the secret $S_T$ is stored on the server involves:
   determining if the secret $S_T$ is already stored on the server for the expiration time T; and
   if not, generating secret $S_T$ for the expiration time T, and storing $S_T$ on the server.

3. The method of claim 1, wherein when the expiration time T is reached, the method further comprises forgetting the secret $S_T$ at the server.

4. The method of claim 1, wherein if N is not received from the encrypter, but is instead generated by the server, sending H from the server to the encrypter additionally involves sending N from the server to the encrypter.

5. The method of claim 1, wherein the secret $S_T$ for expiration time T, is computed by applying a hash function h to a secret $S_{T-1}$ for a preceding expiration time T−1, so that $S_T$=h$(S_{T-1})$;
   whereby space can be saved by storing only the secret $S_T$, and by repeatedly applying the hash function h to $S_T$, to compute secrets for subsequent expiration times.

6. The method of claim 1, wherein the server stores a different secret for each combination of expiration time and security property, whereby the server can store multiple secrets with different security properties for each expiration time.

7. The method of claim 1, wherein the nonce N is a per-message nonce which is generated specifically for the message M.

8. The method of claim 1, wherein storing $S_T$ involves generating and storing $S_T$ on a tamper-resistant smart card, which receives $ID_S$ and N, calculates H, and does not reveal $S_T$.

9. A computer-readable storage medium storing instructions that when executed by a computer cause the computer to perform a method for managing secret keys for messages, wherein the computer-readable storage medium does not contain transitory signals, the method comprising:
   receiving a desired expiration time T and a nonce N at a server that manages keys, wherein T (and possibly N is received from an encrypter of a message M, wherein if N is not received from the encrypter, N is chosen by the server;
   ensuring that a secret $S_T$ associated with the expiration time T is stored on the server so that $S_T$ can be looked up using an identifier $ID_s$;
   calculating a hash $H=h(N, S_T)$, thereby generating a key H for encrypting and decrypting message M;
   sending H and $ID_s$ from the server to the encrypter, thereby allowing the encrypter to encrypt M with H to form (M)H, and to communicate ((M)H,N, $ID_s$);
   to a message reader; deleting H and N at the server before expiration time T and after sending H and IDs to the encrypter; subsequently receiving N and $ID_S$ at the server from the message reader; using $ID_S$ to lookup $S_T$;
   recalculating $H=h(N, S_T)$; and sending H to the message reader, thereby enabling the message reader to decrypt (M)H to obtain M;
   wherein by using the secret $S_T$ associated with the expiration time T and the nonce N, the server is able to reconstruct the secret key H for the message M.

10. The computer-readable storage medium of claim 9, wherein ensuring that the secret $S_T$ is stored on the server involves:

determining if the secret $S_T$ is already stored on the server for the expiration time T; and if not, generating secret $S_T$ for the expiration time T, and storing $S_T$ on the server.

11. The computer-readable storage medium of claim 9, wherein when the expiration time T is reached, the method further comprises forgetting the secret $S_T$ at the server.

12. The computer-readable storage medium of claim 9, wherein if N is not received from the encrypter, but is instead generated by the server, sending H from the server to the encrypter additionally involves sending N from the server to the encrypter.

13. The computer-readable storage medium of claim 9, wherein the secret $S_T$ for expiration time T, is computed by applying a hash function h to a secret $S_{T-1}$ for a preceding expiration time T−1, so that $S_T=h(S_{T-1})$;

whereby space can be saved by storing only the secret $S_T$, and by repeatedly applying the hash function h to $S_T$, to compute secrets for subsequent expiration times.

14. The computer-readable storage medium of claim 9, wherein the server stores a different secret for each combination of expiration time and security property, whereby the server can store multiple secrets with different security properties for each expiration time.

15. The computer-readable storage medium of claim 9, wherein the nonce N is a per-message nonce which is generated specifically for the message M.

16. The computer-readable storage medium of claim 9, wherein storing $S_T$ involves generating and storing $S_T$ on a tamper-resistant smart card, which receives $ID_S$ and N, calculates H, and does not reveal $S_T$.

17. An apparatus that managing secret keys for messages, comprising:

a receiving mechanism configured to receive a desired expiration time T and a nonce N at a server that manages keys, wherein T (and possibly N) is received from an encrypter of a message M, wherein if N is not received from the encrypter, N is chosen by the server;

a key storage mechanism configured to ensure that a secret $S_T$ associated with the expiration time T is stored on the server so that $S_T$ can be looked up using an identifier $ID_S$;

a calculation mechanism configured to calculate a hash $H=h(N,S_T)$, thereby generating a key H for encrypting and decrypting message M;

a sending mechanism configured to send H and $ID_S$ from the server to the encrypter, thereby allowing the encrypter to encrypt M with H to form {M}H, and to communicate ({M}H, N, $ID_S$) to a message reader;

a deleting mechanism configured to delete H and N at the server before expiration time T and after sending H and $ID_S$ to the encrypter;

wherein the receiving mechanism is additionally configured to subsequently receive N and $ID_S$ at the server from the message reader;

a lookup mechanism configured to use $ID_S$ to lookup $S_T$;

wherein the calculation mechanism is additionally configured to recalculate $H=h(N,S_T)$; and wherein the sending mechanism is additionally configured to send H to the message reader, thereby enabling the message reader to decrypt {M}H to obtain M;

wherein by using the secret $S_T$ associated with the expiration time T and the nonce N, the server is able to reconstruct the secret key H for the message M.

18. The apparatus of claim 17, wherein the key storage mechanism is configured to:

determine if the secret $S_T$ is already stored on the server for the expiration time T; and if not, to generate secret $S_T$ for the expiration time T, and to store $S_T$ on the server.

19. The apparatus of claim 17, wherein when the expiration time T is reached, the key storage mechanism is configured to forget the secret $S_T$ at the server.

20. The apparatus of claim 17, wherein if N is not received from the encrypter, but is instead generated by the server, while sending H from the server to the encrypter, the sending mechanism is additionally configured to send N from the server to the encrypter.

21. The apparatus of claim 17, further comprising a key generation mechanism that is configured to compute the secret $S_T$ for expiration time T by applying a hash function h to a secret $S_{T-1}$ for a preceding expiration time T−1, so that $S_T=h(S_{T-1})$;

whereby space can be saved by storing only the secret $S_T$, and by repeatedly by applying the hash function h to $S_T$, to compute secrets for subsequent expiration times.

22. The apparatus of claim 17, wherein the server stores a different secret for each combination of expiration time and security property, whereby the server can store multiple secrets with different security properties for each expiration time.

23. The apparatus of claim 17, wherein the nonce N is a per-message nonce which is generated specifically for the message M.

24. The apparatus of claim 17, wherein storing $S_T$ involves generating and storing $S_T$ on a tamper-resistant smart card, which receives $ID_S$ and N, calculates H, and does not reveal $S_T$.

* * * * *